(12) United States Patent
Schnetzler et al.

(10) Patent No.: US 7,478,981 B2
(45) Date of Patent: Jan. 20, 2009

(54) CONCEALED GLANDULAR SEAL

(75) Inventors: Rene H. Schnetzler, Huntington, NY (US); Young A. Yoon, Deer Park, NY (US)

(73) Assignee: Nutec Components Inc., Deer Park, NY (US)

( * ) Notice: Subject to any disclaimer, the term of this patent is extended or adjusted under 35 U.S.C. 154(b) by 215 days.

(21) Appl. No.: 11/635,419

(22) Filed: Dec. 7, 2006

(65) Prior Publication Data
US 2007/0246889 A1 Oct. 25, 2007

Related U.S. Application Data

(60) Provisional application No. 60/748,074, filed on Dec. 7, 2005.

(51) Int. Cl.
*B23C 9/00* (2006.01)
*F16J 15/00* (2006.01)

(52) U.S. Cl. ............... 409/134; 277/345; 277/500; 49/303; 384/15; 384/624

(58) Field of Classification Search ............ 409/134; 277/345, 500; 49/303, 316, 317, 483.1, 490.1, 49/495.1, 498.1; 318/649, 652; 384/7, 8, 384/9, 10, 11, 12, 13, 15
See application file for complete search history.

(56) References Cited

U.S. PATENT DOCUMENTS

| | | | | | |
|---|---|---|---|---|---|
| 4,704,712 | A | * | 11/1987 | Siryj | 384/8 |
| 5,449,256 | A | * | 9/1995 | Sundman | 409/134 |
| 6,467,761 | B1 | * | 10/2002 | Amatucci et al. | 269/58 |
| 6,693,401 | B1 | * | 2/2004 | Schnetzler et al. | 318/649 |
| 7,409,118 | B2 | * | 8/2008 | Said et al. | 385/12 |

* cited by examiner

*Primary Examiner*—Dana Ross
(74) *Attorney, Agent, or Firm*—The Farrell Law Firm, PC

(57) ABSTRACT

Disclosed herein is a contamination protection apparatus that includes a concealed linear glandular seal for providing continuous protection along an entire length of a movable table of a precision apparatus such as testing and metrology machines, laser machines, biomedical equipment, and precision fabricating machines. The disclosed glandular seal is formed on an inner structure of the protective apparatus, which includes a plurality of mechanical translation stages positioned in the inner structure and two normally closed linear parts of the glandular seal attached to respective mechanical translation stages. The linear parts interfere with each other and are opened by movement of a mechanical translation stage saddle.

9 Claims, 8 Drawing Sheets

US 7,478,981 B2

CONCEALED GLANDULAR SEAL

PRIORITY

This application claims priority to a provisional application filed with the U.S. Patent and Trademark Office on Dec. 7, 2005, and assigned application Ser. No. 60/748,074.

BACKGROUND OF THE INVENTION

1. Field of the Invention

The present invention relates generally to a protective device for a mechanical translation stage, and more particularly to a device having a concealed linear glandular seal.

2. Description of the Related Art

The present invention is directed to a mechanical translation stage, and more particularly to a protective device with a concealed linear glandular seal. Mechanical translation stages often are employed in hostile environments that contain contamination that will interfere with the proper function of translation stages. To solve this problem, manufacturers of positioning devices and translating stages have introduced a number of remedies.

Conventional protection elements include bellows of various configurations and materials, metal covers and shields, tape seals of steel and synthetic materials, overlapping steel guards, and rolling shade type shielding. Protection elements in these designs have a disadvantage in that the protective device is exposed to the contamination and therefore subject to the brunt of the harsh effect, particularly in laser beam exposure.

Conventional protection elements also require frequent cleaning to remove debris from the protective device for maintaining proper function. Frequent replacements due to wear and tear cause another problem. Furthermore, none of the conventional devices offers full protection, since there is generally a gap between junctions where different parts of the protective device assembly meet and where the moving and stationary parts interface. In addition, these gaps are typically located at the most exposed area, thereby further reducing the effectiveness of the device. Therefore, the protection is not complete and is subject to rapid degradation.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention are described herein making reference to the accompanying drawings. In the following description, well-known functions or constructions are not described in detail since they are clearly understood in the art upon consideration of the present disclosure.

The unique features of the present invention are simple and inexpensive to use, and can be used as an improved and complete protection means in a contaminated environment for an extended period.

Figure 1:
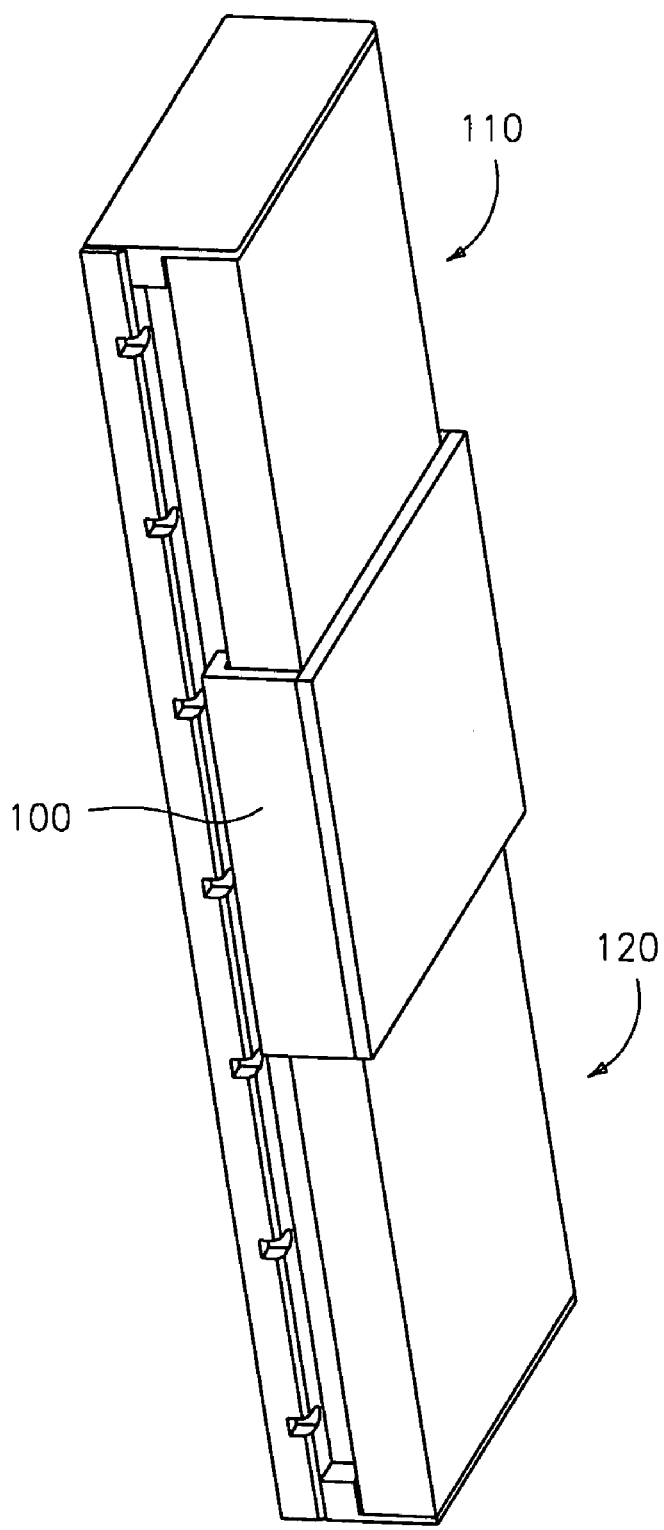
FIG. 1 is a perspective view of a protective device according to an embodiment of the present invention.
Figure 2:
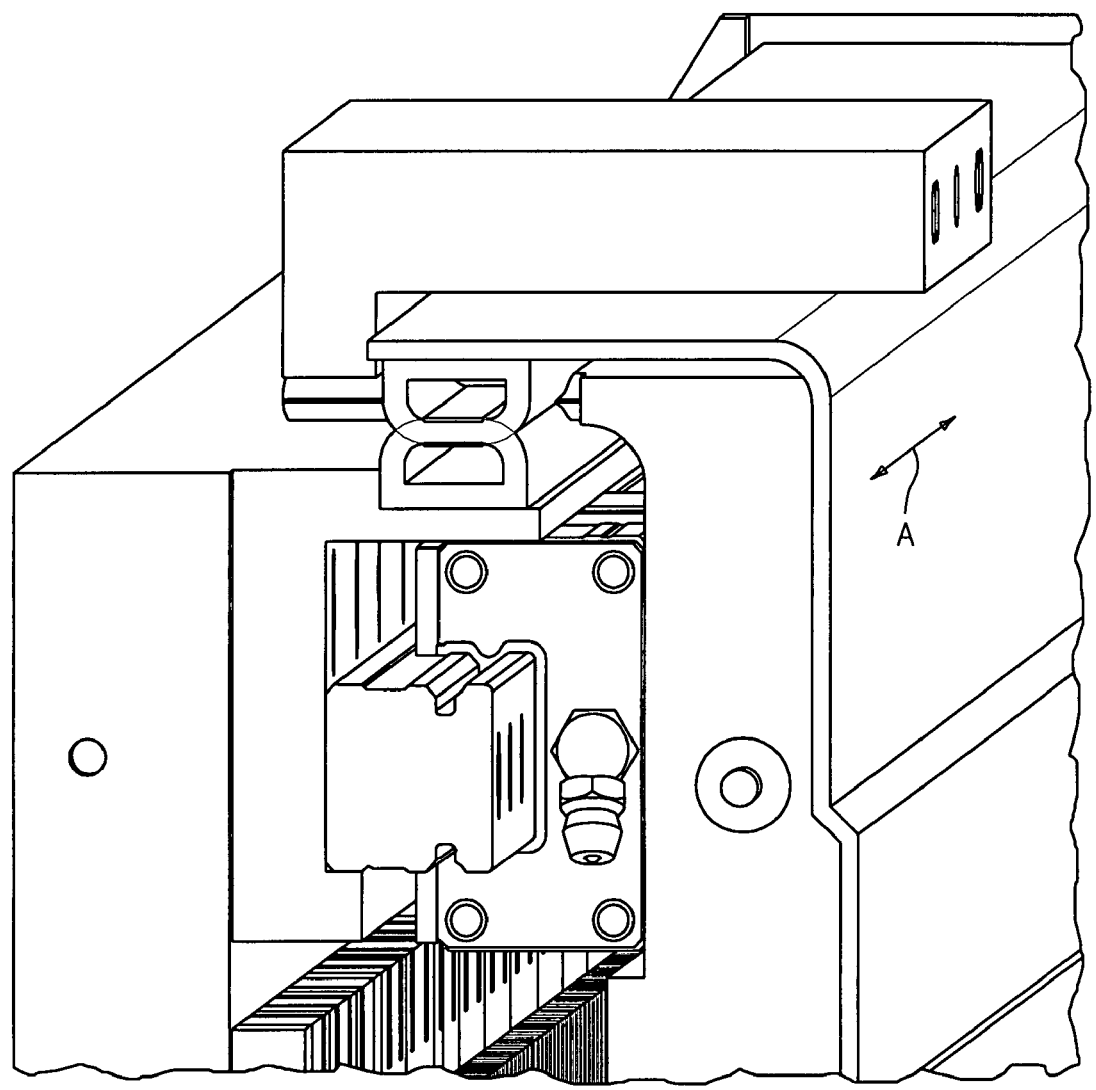
FIG. 2 is a cross sectional perspective view showing an inner structure of the protective device of the present invention.
Figure 3:
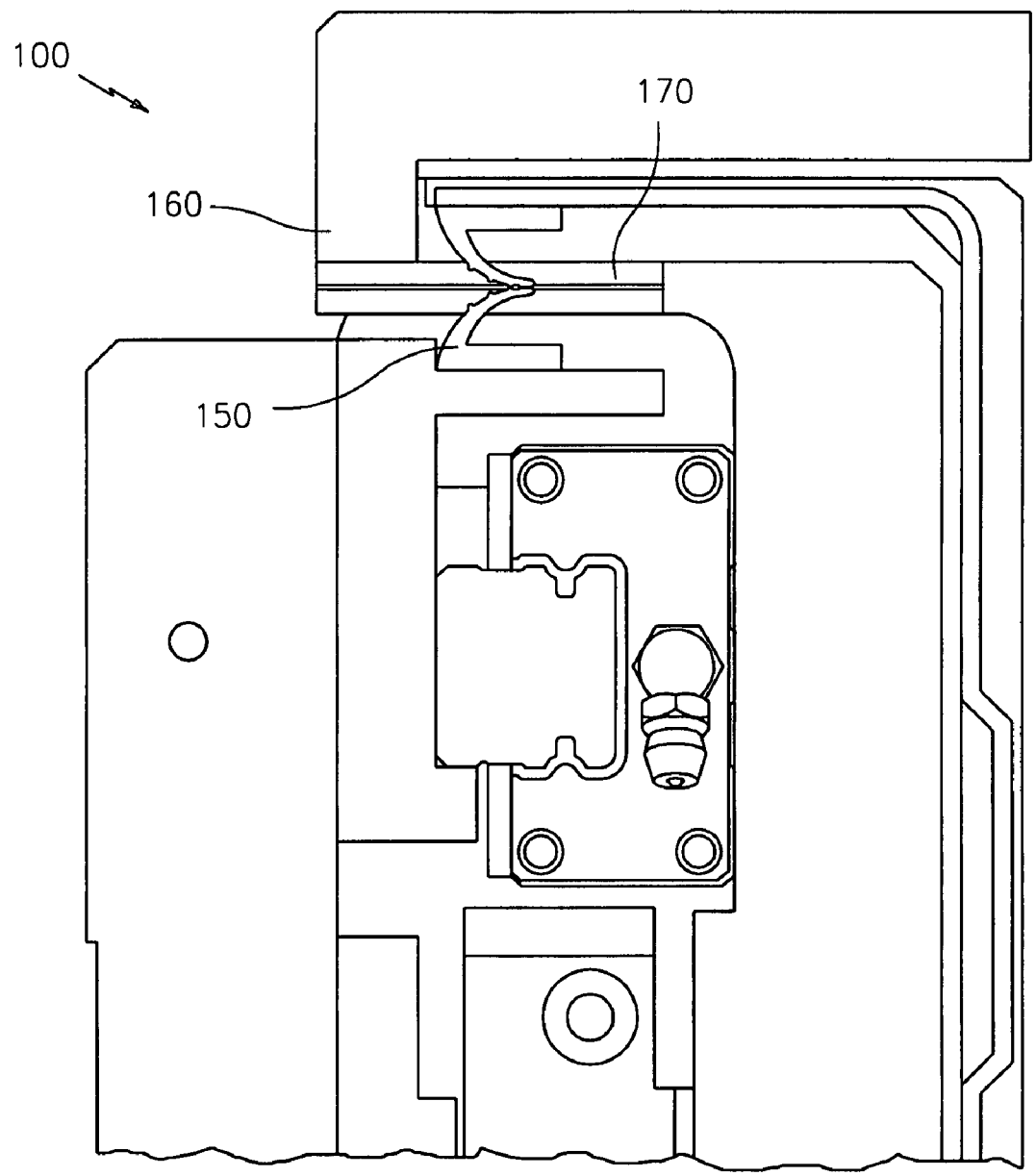
FIG. 3 is a cross-sectional view of a seal of the protective device of the present invention in a closed position.
Figure 4:
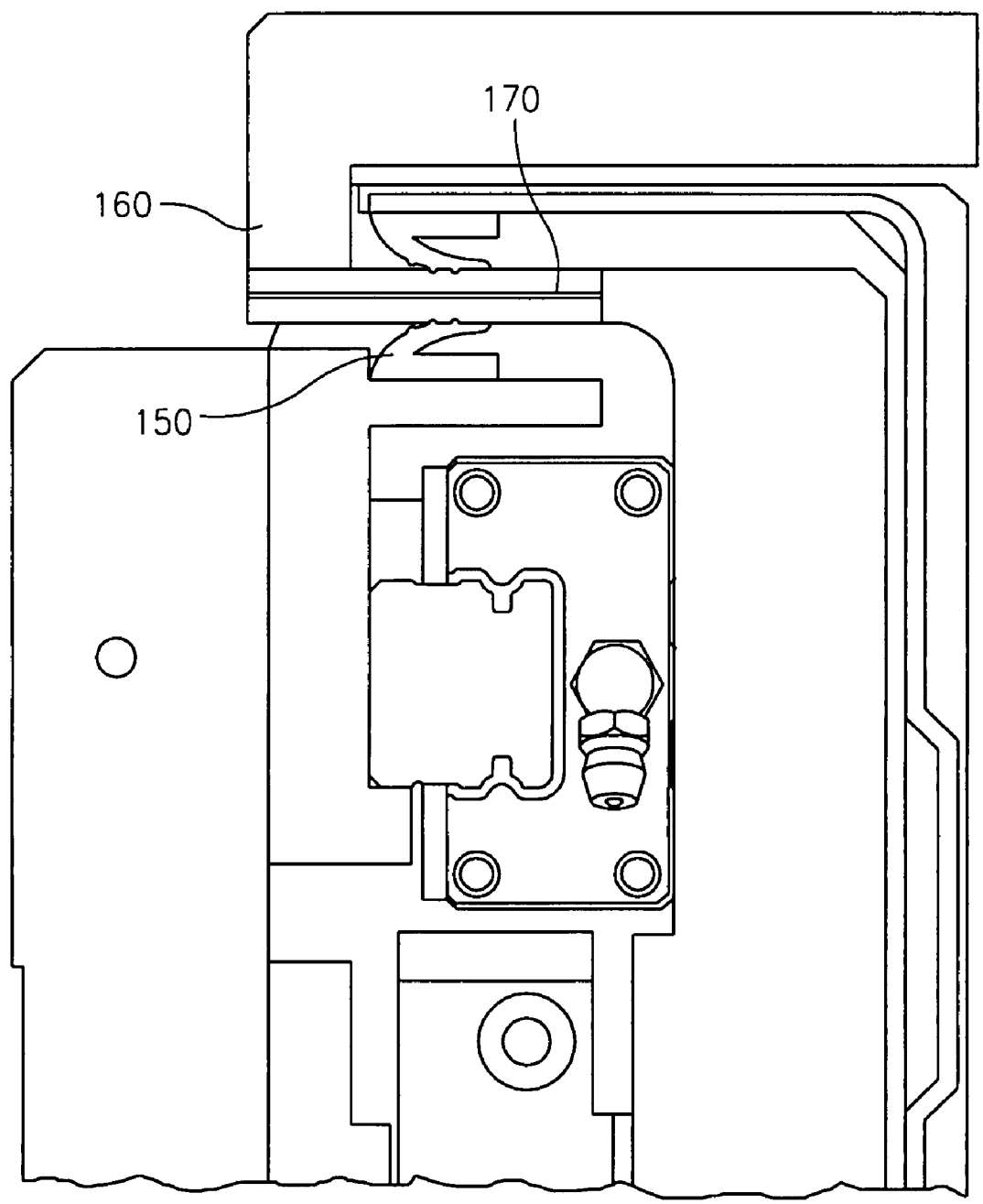
FIG. 4 illustrates a cross-sectional view of the seal of the protective device of the present invention in an open position.

FIG. 1 illustrates a perspective view of a protective device attached in the mechanical translation stages (110, 120). FIGS. 2-4 provide cross-section views of an inner structure of the protective device showing a seal 100 attached the translation stages 110 according to a first embodiment of the invention. The seal 100 includes two linear parts that form a glandular seal 100 having a small physical form factor so that the linear parts interfere with and close against each other. The glandular seal has flexibility to allow its linear parts of to move apart from and close against each other.

The seal extends in a longitudinal motion direction ("A" in FIG. 2) in the motion direction of the mechanical translation stages (110, 120 of FIG. 1). The seal 100 extends along the entire length of the translation stage (110, 120) and is active at any given point of travel. As shown in FIG. 3, lips (150, 160) of the linear parts close against each other and progressively protect from contamination entering or leaving the otherwise unsealed translation stages.

The moving part of the stage, a saddle 170 includes a blade 180 that progressively parts the seal 100 as the saddle 170 moves along. The seal 100 progressively parts over its entire length by protrusion of the blade 180 portion of the saddle 170 through two opposing lips (150, 160) of the seal, as shown in FIG. 4. Therefore, the lips (150, 160) are either closed on each other or closed on the saddle, thereby closing the whole length of the stage and avoiding contamination while allowing free linear movement. Lips 150, 160 of the seal 100 are stationary on the stage, providing an inner and an outer part. Protruding through the seal is the moving blade part of the saddle 170 of the stage. The glandular seal 100 is protected from the outside where the contaminated environment is present, since the seal 100 is hidden or concealed.

Figure 5:
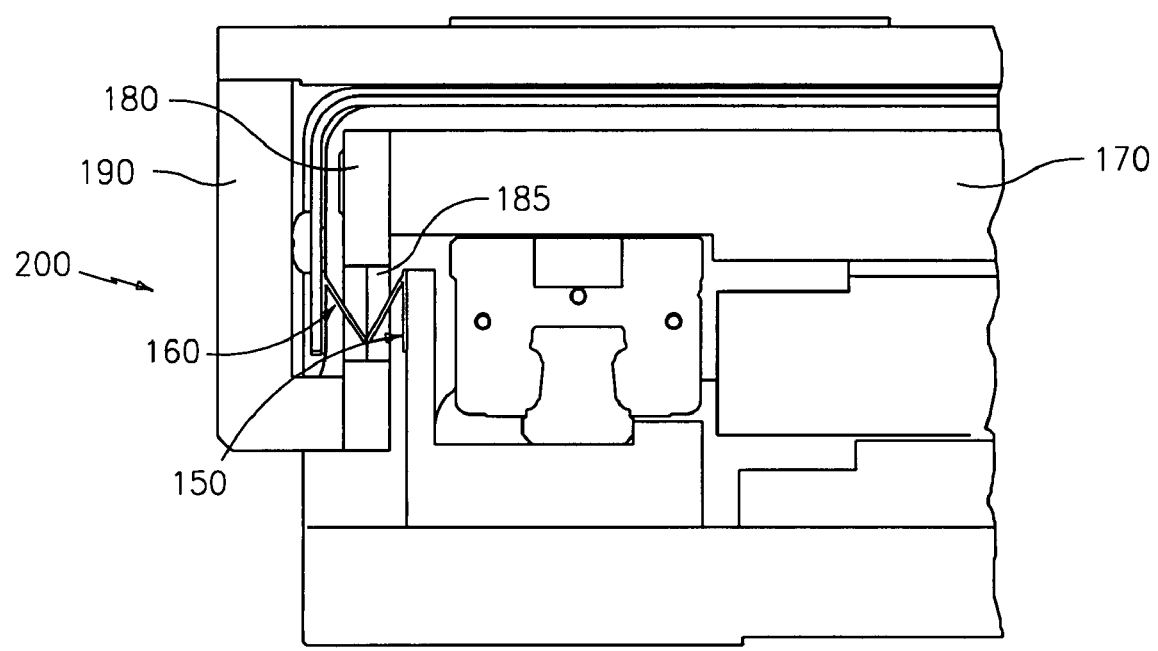
FIG. 5 illustrates a cross-sectional view of another embodiment of the protective device the present invention, with the seal in an open position.
Figure 6:
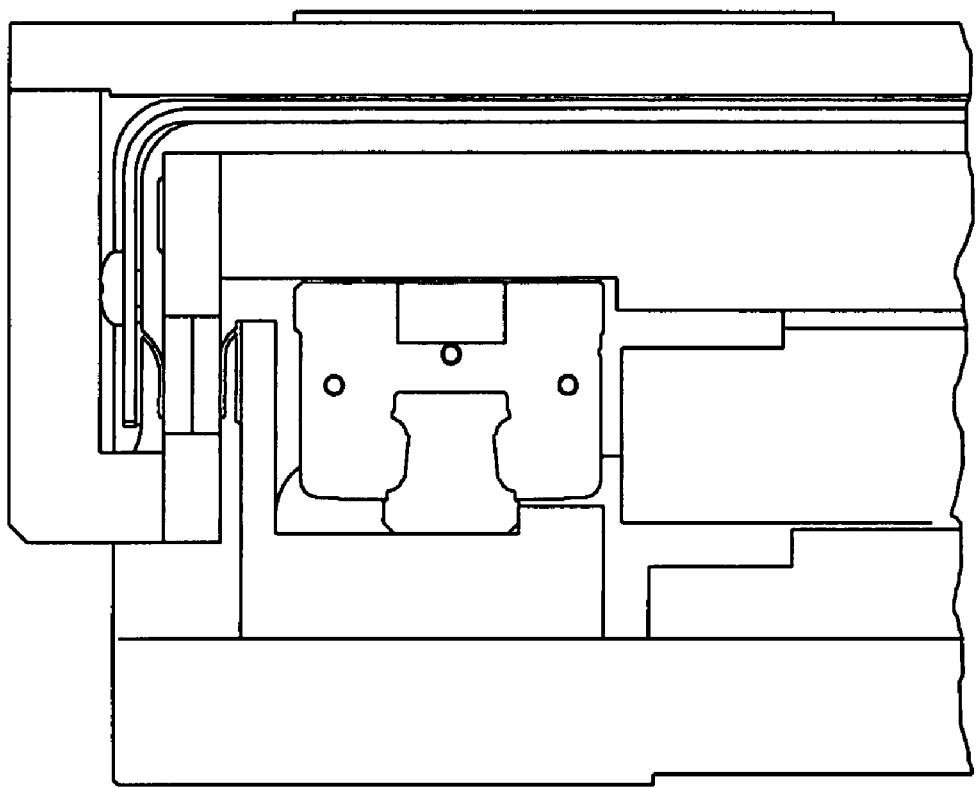
FIG. 6 illustrates a cross-sectional view of the protective device of the present invention with the seal in a closed position.
Figure 7:
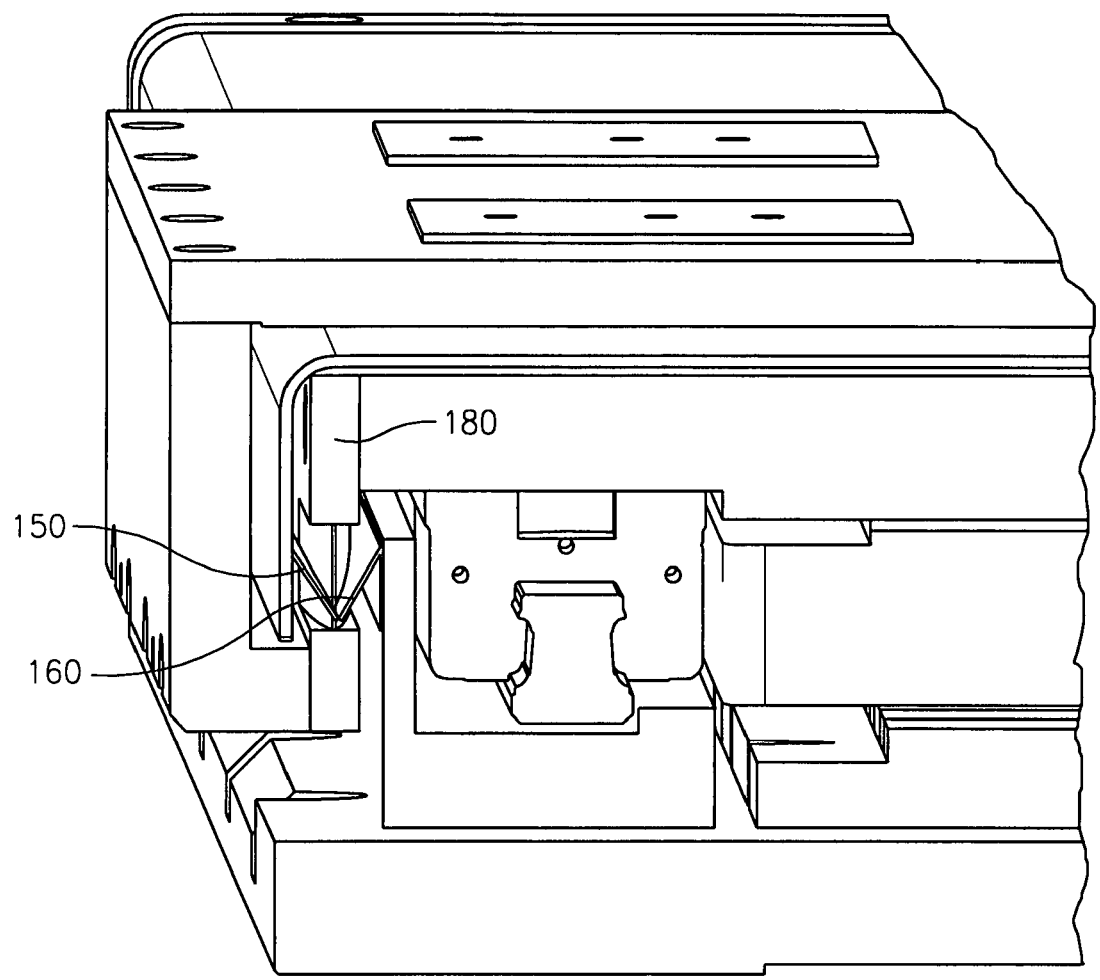
FIG. 7 is a perspective cross-sectional view of the protective device of the present invention.
Figure 8:
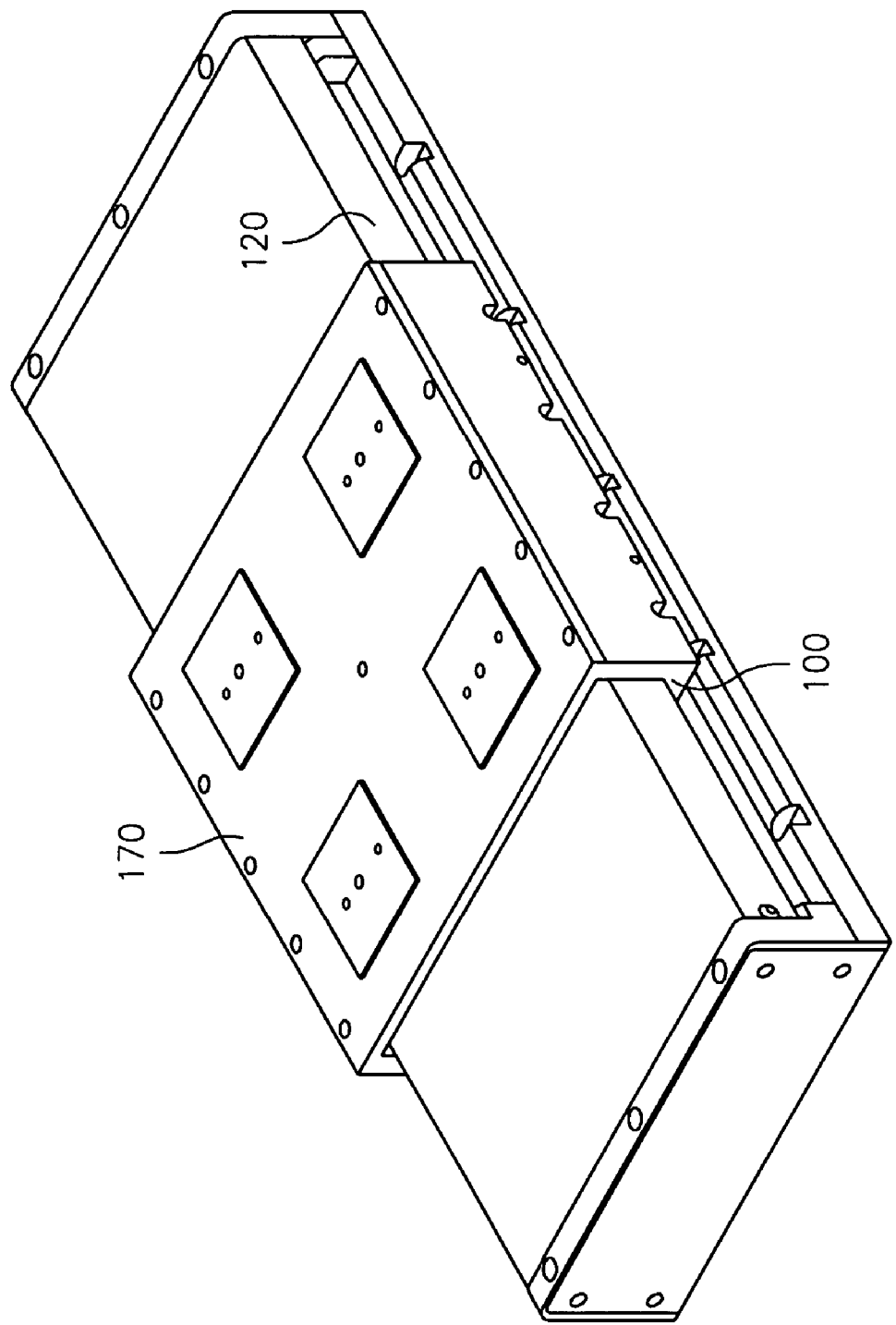
FIG. 8 is a perspective view of exterior of the protective device of the present invention.

Another embodiment of the protective device of the invention is shown in FIGS. 5-8. FIGS. 7 and 8 provide a perspective cutaway and exterior views, respectively, of the protective device of this embodiment of the present invention. FIGS. 5 and 6 detail a manner of providing a separate blade constructed of material that is different from the saddle material. It is preferable for the saddle to be constructed from aluminum or other lightweight material, and for the blade to be constructed of steel or similar material having a high degree of wear ability.

The glandular seal 100 is preferably made of a synthetic material such as plastic and rubber, which provides optimum properties such as flexibility, pliability and friction to adapt to the repeating deformation when opening and closing.

The seal of the present invention has a considerable life expectancy that far exceeds the life of any conventional protective device. The unique positioning of the glandular seal reduces the mechanical requirement so that protection is only needed against airborne light particles to overcome the gravity effect and rising towards the seal. The seal of the present invention has a seal closure effectiveness estimated at 99.5%.

The lip-type seal of the preferred embodiment of the present invention is applicable to typical translation stages of dedicated machines or machine tools, and more particularly, to precision equipment, testing and metrology machines, laser machines, biomedical equipment, and precision fabricating machines. Equipment operating under severe contaminated environments can be also equipped with the concealed glandular seals. The invention has proven particularly useful in cleanroom and vacuum environments that require non-contaminating devices that keep contaminants generated by a machine contained within the machine, such as maintaining grease necessary for machine operation within the machine.

While the invention has been shown and described with reference to a certain preferred embodiment thereof, it will be understood by those skilled in the art that various changes in form and details may be made therein without departing from the spirit and scope of the invention.

What is claimed is:

1. A contamination protection apparatus comprising:
   a plurality of fixed mechanical translation stages positioned on an inner structure of the protective apparatus;
   a blade portion of a saddle that moves in a longitudinal direction along the mechanical translation stages;
   a glandular seal having normally closed linear parts attached to respective mechanical translation stages, wherein the seal is made of a flexible material and the linear parts interfere with each other and are progressively opened in the longitudinal direction by progressive movement of the saddle.

2. The apparatus of claim 1, wherein the saddle is made of lightweight material and the blade is made of steel.

3. The apparatus of claim 2, wherein the seal extends along an entire length of the mechanical translation stages.

4. The apparatus of claim 3, wherein the glandular seal is active only at any given point of travel of the mechanical translation stage.

5. The apparatus of claim 1, wherein the linear parts have a small physical form factor.

6. The apparatus of claim 5, wherein the linear parts include lips that either close on each other or close against the saddle, thereby closing an entire length of the mechanical translation stage.

7. The apparatus of claim 1, wherein the glandular seal is made of a plastic material.

8. The apparatus of claim 1, wherein the seal is concealed from the environment.

9. The apparatus of claim 1, wherein the seal consists of two identical parts.

* * * * *